(12) United States Patent
Eatherton et al.

(10) Patent No.: US 7,313,093 B1
(45) Date of Patent: Dec. 25, 2007

(54) METHODS AND APPARATUS FOR SELECTIVELY DISCARDING PACKETS DURING OVERLOAD CONDITIONS

(75) Inventors: William N. Eatherton, San Jose, CA (US); John H. W. Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1048 days.

(21) Appl. No.: 10/304,421

(22) Filed: Nov. 26, 2002

(51) Int. Cl.
*H04L 12/56* (2006.01)

(52) U.S. Cl. .................. 370/230; 370/235.1; 370/236; 370/469

(58) Field of Classification Search ................ 370/229, 370/230, 235, 235.1, 236, 236.1, 236.2, 401, 370/412, 469
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |
| 4,734,907 A | 3/1988 | Turner | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,127,000 A | 6/1992 | Henrion | |
| 5,173,897 A | 12/1992 | Schrodi et al. | |
| 5,179,551 A | 1/1993 | Turner | |
| 5,179,556 A | 1/1993 | Turner | |
| 5,229,991 A | 7/1993 | Turner | |
| 5,253,251 A | 10/1993 | Aramaki | |
| 5,260,935 A | 11/1993 | Turner | |
| 5,339,311 A | 8/1994 | Turner | |
| 5,402,415 A | 3/1995 | Turner | |
| 5,842,040 A | 11/1998 | Hughes et al. | |
| 5,905,725 A | 5/1999 | Sindhu et al. | |
| 6,885,638 B2* | 4/2005 | Xu et al. | 370/230 |
| 7,061,862 B2* | 6/2006 | Horiguchi et al. | 370/230 |
| 2002/0034949 A1* | 3/2002 | Hoff et al. | 455/445 |
| 2003/0012137 A1* | 1/2003 | Abdelilah et al. | 370/229 |
| 2003/0189943 A1* | 10/2003 | Gorti et al. | 370/412 |
| 2003/0223368 A1* | 12/2003 | Allen et al. | 370/235 |

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Min Jung
(74) *Attorney, Agent, or Firm*—The Law office of Kirk D. Williams

(57) ABSTRACT

Methods and apparatus are disclosed for selectively discarding packets such as in, but not limited to a packet switching system, by reacting to packet traffic conditions to reduce or eliminate the indiscriminate discarding of packets during identified overload conditions. Typically, a first element forwards multiple packets to a second element, each of the multiple packets being associated with a packet overload condition type of possible packet overload condition types, including, but not limited to a discard-on-overload type and a retain-on-overload type. The first element forwards a condition indication to the second element. The second element receives the condition indication and a particular packet. The second element discards the particular packet if the received condition indication is associated with the overload state and the packet overload condition type of the particular received packet is associated with the discard-on-overload type. Otherwise, the second element typically further processes the particular packet.

4 Claims, 6 Drawing Sheets

OTHER PUBLICATIONS

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

METHODS AND APPARATUS FOR SELECTIVELY DISCARDING PACKETS DURING OVERLOAD CONDITIONS

FIELD OF THE INVENTION

This invention especially relates to communications and computer systems; and more particularly, the invention relates to methods and apparatus for selectively discarding packets during overload conditions, such as in, but not limited to a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

In a typical packet switching system, packets are received by a layer 2 (L2) processing hardware component and placed in a packet queue. The L2 processing hardware component may perform some low-level processing on the packet, such as error detection and correction, but the filtering and routing decisions are typically made by a downstream forwarding engine component. These functions are typically placed in separate application-specific integrated circuits (ASICs), which allows, inter alia, for different L2 processing hardware components supporting different protocols to be attached to the packet processing engine, and the packet processing engine might be used in other locations in the packet processing switch, such on the egress side of a switch fabric and thus not used in conjunction with the L2 processing hardware.

Depending on the incoming line rate and arriving packet burst rate, it may be possible for the queue within the L2 processing hardware to overflow if packets are not removed from the queue fast enough (e.g., sent to the forwarding engine fast enough). In which case, typically the newly arriving packets may be dropped indiscriminately as there is no place to store them. This indiscriminate dropping of packets can be problematic as these indiscriminately dropped packets may include control packets, such as, but not limited to L2 keep-alive and routing information packets. When such control packets are dropped, the packet switching system or the system sending it traffic may interpret the incoming link or the packet switching system as being down, and then reconfigure the network. Moreover, the L2 processing hardware does not have enough knowledge to determine what packets are control packets and which packets can be dropped. For example, the route forwarding information base corresponds to higher-level protocol processing, which is typically performed by the packet forwarding engine. Thus, the L2 processing hardware does not know if a packet is a packet addressed to the packet switch control processing element (i.e., one type of control packet) or not. Needed are new methods and apparatus for reducing or eliminating this indiscriminate discarding of packets.

SUMMARY OF THE INVENTION

Methods and apparatus are disclosed for selectively discarding packets during overload conditions, such as in, but not limited to a packet switching system. One embodiment reacts to packet traffic conditions in its operation to reduce or eliminate the indiscriminate discarding of packets. In one embodiment, a first element forwards multiple packets to a second element, each of the multiple packets being associated with a packet overload condition type of possible packet overload condition types, including, but not limited to a discard-on-overload type and a retain-on-overload type. The first element forwards a condition indication to the second element. The second element receives the condition indication and a particular packet. The second element discards the particular packet if the received condition indication is associated with the overload state and the packet overload condition type of the particular received packet is associated with the discard-on-overload type. Otherwise, in one embodiment, the second element further processes the particular packet.

In one embodiment, the second element receives the overload indication in one of the multiple packets. In one embodiment, second element receives the overload indication via an out-of-band signaling mechanism. In one embodiment, the first element corresponds to a layer 2 processing engine, and the second element corresponds to a forwarding engine. In one embodiment, the first element identifies the condition indication, which may include comparing an occupancy level of a packet queue to one or more predetermined values. In one embodiment, the condition indication includes an overload state flag. In one embodiment, the second element determines whether or not the condition indication is associated with the overload state, which may include comparing a value of the condition indication to one or more predetermined values. In one embodiment, the value of the condition indication includes an indication of an occupancy level of a packet queue.

In one embodiment, identifying the packet overload condition type of the particular received packet includes identifying whether the packet is a control packet. In one embodiment, identifying the packet overload condition type of the particular received packet includes performing a data structure lookup operation, such as for, but not limited to identifying routing information of the packet, whether the packet is locally or remotely destined, whether the packet corresponds to a route update packet or a L2 keep alive packet, whether the packet corresponds to high or low priority traffic, etc.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
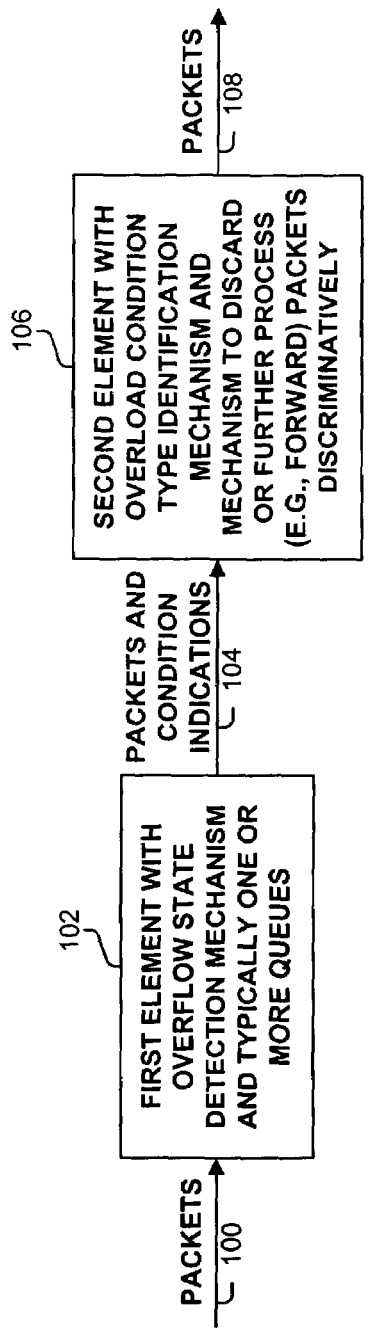
FIG. 1A is a block diagram of first and second elements used in one embodiment.

Methods and apparatus are disclosed for selectively discarding packets during overload conditions, such as in, but not limited to a packet switching system. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for selectively discarding packets during overload conditions, such as in, but not limited to a packet switching system. One embodiment reacts to packet traffic conditions in its operation to reduce or eliminate the indiscriminate discarding of packets. In one embodiment, a first element forwards multiple packets to a second element, each of the multiple packets being associated with a packet overload condition type of possible packet overload condition types, including, but not limited to a discard-on-overload type and a retain-on-overload type. The first element forwards a condition indication to the second element. The second element receives the condition indication and a particular packet. The second element discards the particular packet if the received condition indication is associated with the overload state and the packet overload condition type of the particular received packet is associated with the discard-on-overload type. Otherwise, in one embodiment, the second element further processes the particular packet.

In one embodiment, the second element receives the overload indication in one of the multiple packets. In one embodiment, second element receives the overload indication via an out-of-band signaling mechanism. In one embodiment, the first element corresponds to a layer 2 processing engine, and the second element corresponds to a forwarding engine. In one embodiment, the first element identifies the condition indication, which may include comparing an occupancy level of a packet queue to one or more predetermined values. In one embodiment, the condition indication includes an overload state flag. In one embodiment, the second element determines whether or not the condition indication is associated with the overload state, which may include comparing a value of the condition indication to one or more predetermined values. In one embodiment, the value of the condition indication includes an indication of an occupancy level of a packet queue.

In one embodiment, identifying the packet overload condition type of the particular received packet includes identifying whether the packet is a control packet. In one embodiment, identifying the packet overload condition type of the particular received packet includes performing a data structure lookup operation, such as for, but not limited to identifying routing information of the packet, whether the packet is locally or remotely destined, whether the packet corresponds to a route update packet or a L2 keep alive packet, whether the packet corresponds to high or low priority traffic, etc.

In one embodiment, more than two operating level states are maintained either by first element or second element, and the second element selectively discards packets differently during states associated with overload conditions. For example, in a non-overflow state, no packets are dropped. In a low-level overflow state, no control packets are dropped; while in a high-level overflow state, only L2 keep-alive packets are not dropped or only packets not destined for the control process of the local system are not dropped (and thus control packets for remote or downstream systems are dropped.)

FIG. 1A illustrates one embodiment selectively discarding packets during overload conditions. Packets 100 are received by first element 102, which maintains a current overflow (e.g., discard-on-overload) or non-overflow (e.g., retain-on-overload) state and typically one or more packet queues. In one embodiment, the current overflow or non-overflow state is determined based on an occupancy level of the one or more queues and/or any other identifiable traffic or processing characteristic. In one embodiment, first element 102 corresponds to a L2 processing hardware and second element 106 corresponds to a packet forwarding engine.

Packets are typically forwarded to second element 106 over any possible communication mechanism 104 as fast as second element 106 can process them. In addition, condition indications of the current overflow or non-overflow state of first element 102 are communicated to second element 106 using any possible communication mechanism 104. In one embodiment, these condition indications are included in the packets. In one embodiment, these condition indications are communicated via an out-of band signal, such as, but not limited to over another wire or signaling link.

Second element 106 receives the packets and condition indications. For a particular packet, second element 106 identifies a packet overload condition type of the particular packet, such as, but not limited to using one or more data structure lookup operations based on values in one or more fields of the packet. Based on the current overload condition state associated with the latest received or corresponding condition indication and the overload condition type of the packet, second element 106 will discriminately drop or further process (e.g., routing, classification, filtering, forward) the packet. These discriminately forwarded packets are indicated as packets 108.

In one embodiment, first element 102 has two thresholds on its input buffer. The top threshold is triggered when the input buffer is filling and the bottom threshold is triggered when the input buffer is draining. The input buffer will start filling up when second element 106 engine is unable to keep up with the incoming packet rate. When the input buffer starts filling up and the top threshold is reached, it will indicate to second element 106 engine, that congestion is occurring and that second element 106 should go into "congestion avoidance" mode, which will speed up its processing of packets, and thus drain the input queue of element 102 faster.

In one embodiment, second element 106 receives the condition indication of the overload mode in a field (e.g., a flag bit, value, etc.) in the shim header of a packet. Once second element 106 completes the layer-2 parsing of the packet, second element 106 performs a classification check using a data structure lookup operation to classify the packet into one of two different categories: packets that are important for the router, and packets that are not. Packets that are important to the router included, but are not limited to L2 keep-alive and routing update packets. All other packets are dropped as soon as they are classified as non-important. As there will be many more non-important packets than important packets, the input buffer of element 102 will start to drain, as second element 106 will be processing packets at a much faster rate. Once the input buffer drains to the point where the bottom threshold is reached, the first element 102 will indicate to second element 106 that it can go back to the "normal" mode of processing packets. In one embodiment, this is indicated to second element 106 by the absence of the congestion bit in the shim header of a packet. An advantage of one embodiment which has second element 106 performing the classification is that second element 106 is usually designed with the most flexibility to do the classifications and can be changed if the features/protocols in the future change which packets are determined to be important.

Figure 1B:
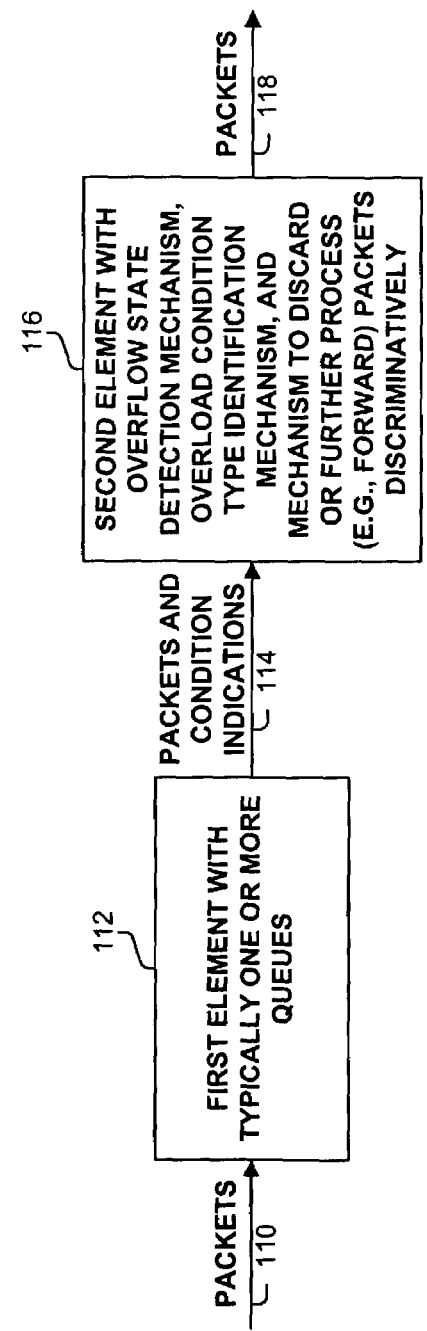
FIG. 1B is a block diagram of first and second elements used in one embodiment.

FIG. 1B illustrates another embodiment selectively discarding packets during overload conditions, and demonstrates the extensibility of the mechanisms used to communicate between the first and second elements the condition indication and to control the reaction thereto. In one embodiment, packets 110 are received by first element 112. Packets 108 and condition indications are forwarded to second element 116 over any possible communication mechanism 114 as fast as second element 116 can process the packets. In one embodiment, these condition indications correspond to occupancy level indications of one or more packet queues and/or any other identifiable traffic or processing characteristic. Second element 116 processes these condition indications to identify and maintain a current overload state (in contrast to first element 102 maintaining the overflow state in FIG. 1A). Based on the identified/determined current overload condition state associated with the latest received or corresponding condition indication and the overload condition type of the packet, second element 116 will discriminately drop or further process (e.g., routing, classification, filtering, forward) the packet. These discriminately forwarded packets are indicated as packets 118.

Figure 1C:
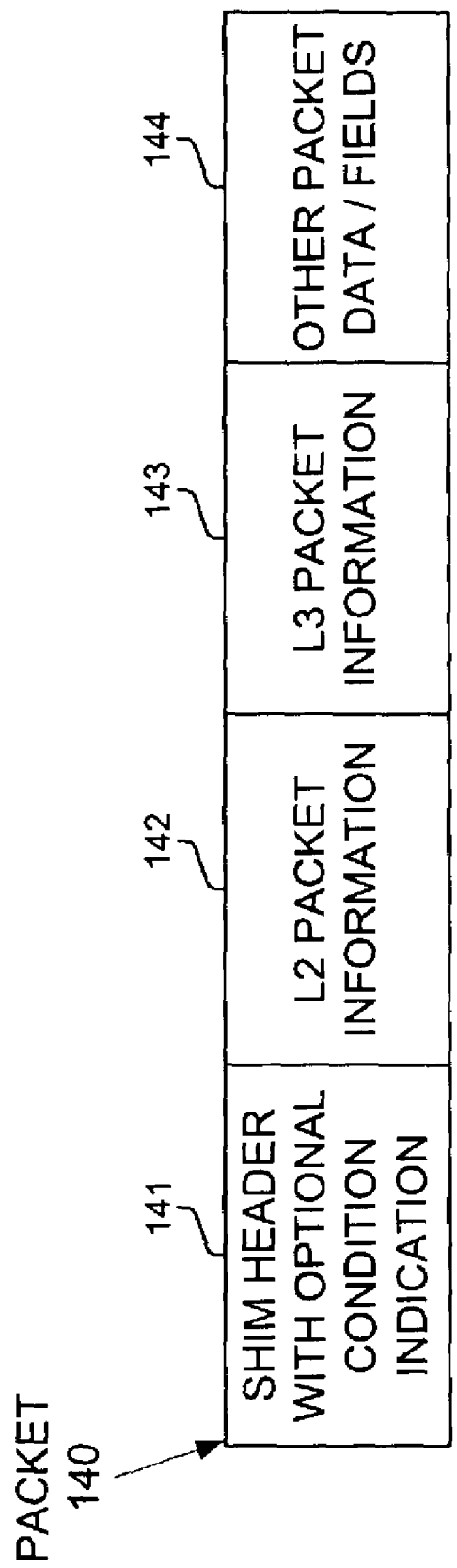
FIG. 1C is a block diagram of a packet format used in one embodiment for communicating an overload or non-overload condition to the second element.

FIG. 1C illustrates the format of a packet 140 used in one embodiment. As shown, packet 140 includes a shim header with an optional condition indication 141, L2 packet information 142, L3 packet information 143, and other fields 144. In one embodiment, shim header 141 includes one or more bits to indicate the congestion condition (e.g., overflow state, packet queue occupancy level, etc.) In one embodiment, these overflow condition indication bits are contained elsewhere in packet 140.

Figure 2:
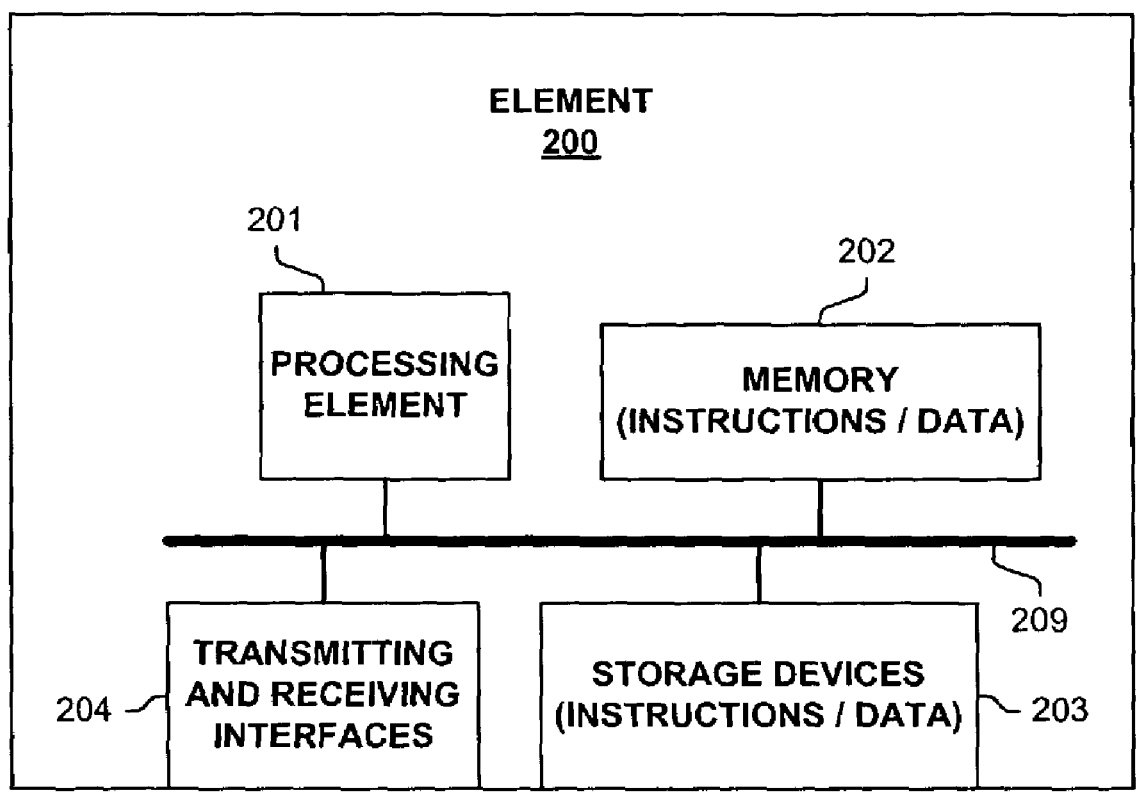
FIG. 2 is a block diagram of an element used in one embodiment.

FIG. 2 illustrates one embodiment of an element 200. In one embodiment, first element 102 and/or second element 106 (FIG. 1A) and/or first element 112 and/or second element 116 (FIG. 1B) includes element 200 or some of its components. In one embodiment, element 200 includes a processing element 201, memory 202, storage devices 203, and one or more transmitting and receiving interfaces 204 for communicating among elements, other components, and/or external devices. Processing element 201, memory 202, storage devices 203, and one or more transmitting and receiving interfaces 204 are typically coupled via one or more communications mechanisms 209 (shown as a bus for illustrative purposes). Various embodiments of element 200 may include more or less elements. The operation of element 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3A:
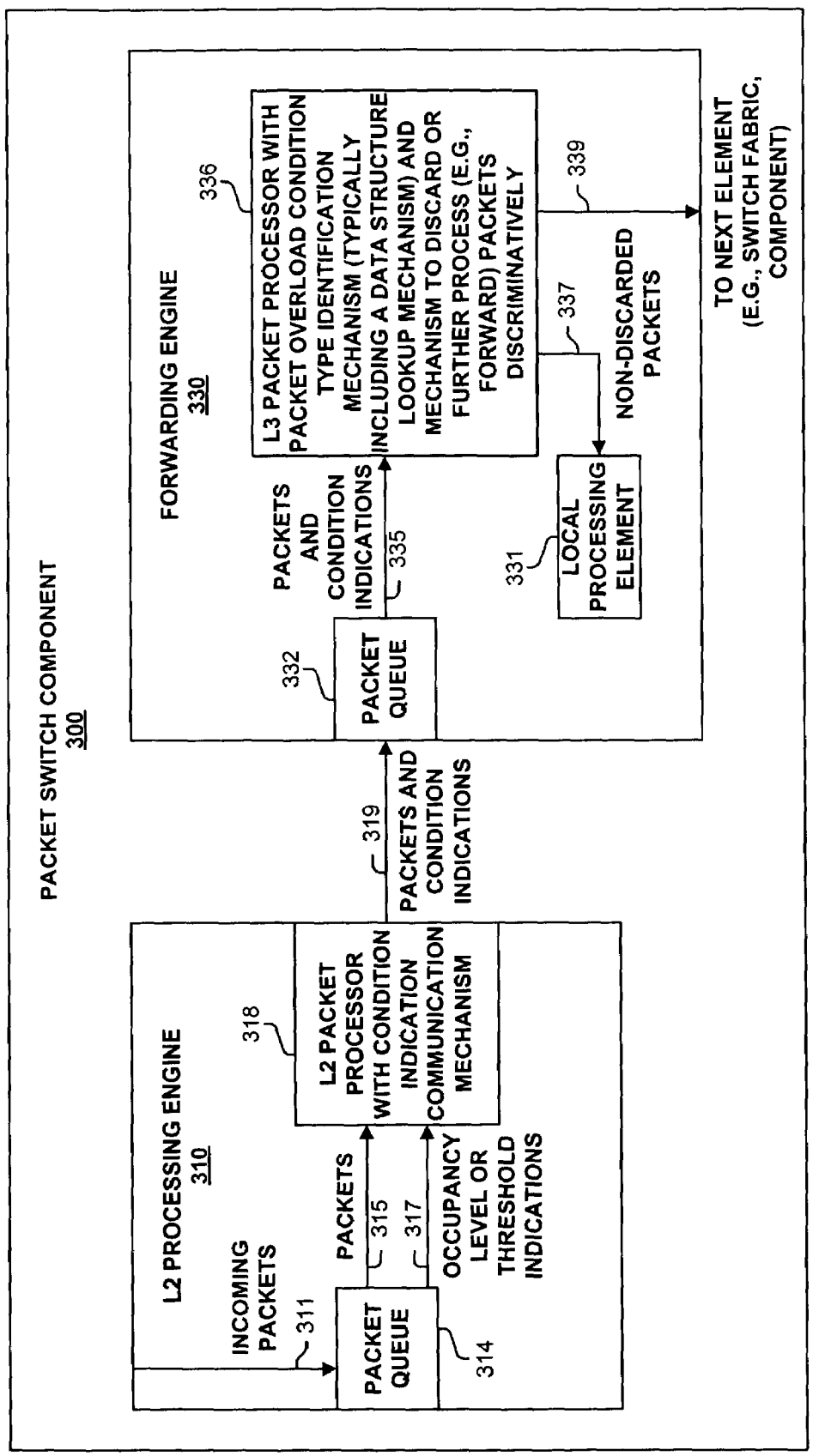
FIG. 3A is a block diagram of a packet switching component including first and second elements of one embodiment.

FIG. 3A illustrates a packet switch component 300 used in one embodiment. As shown, packet switch component 300 includes L2 processing engine 310 coupled via one or more links 319 to forwarding engine 330.

L2 processing engine 310 receives packets 311 and stores them one or more packet queues 314. In one embodiment, one or more packet queues 314 generates occupancy level or threshold indications 317 to L2 packet processor with condition indication mechanism 318. A particular packet of packets 315 is removed from one or more packet queues 314 by L2 packet processor 318, which typically adds a shim header including a condition indication to the particular packet to indicate the occupancy level or threshold indications 317 or a current overload or non-overload condition of L2 processing engine 310 (which may do some additional processing of the particular packet) derived there from. The particular packet is then forwarded over one or more links 319 to forwarding engine 330. In one embodiment, the condition indication is communicated outside the particular packet to forwarding engine 330 over one or more links 319.

Figure 3B:
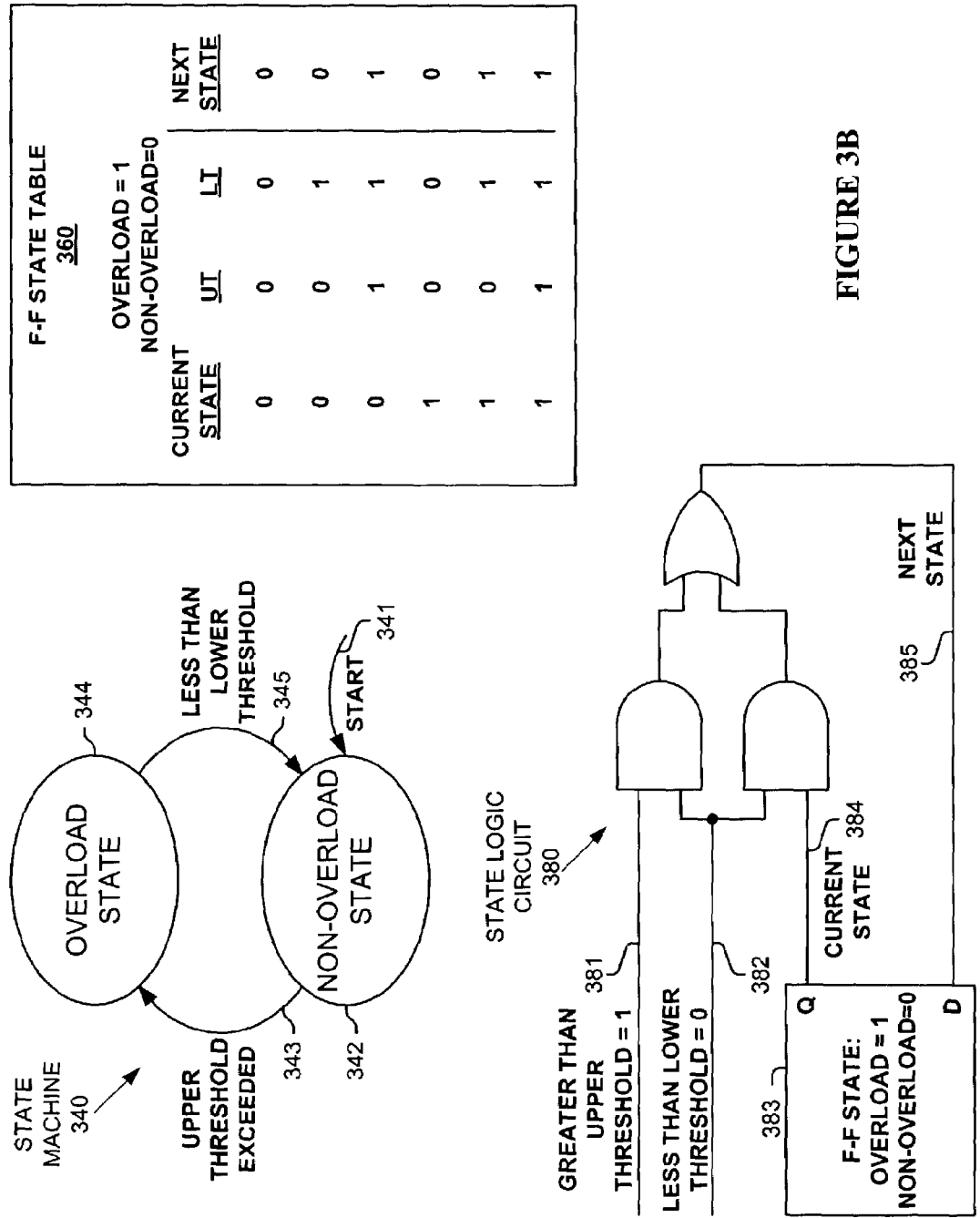
FIG. 3B is a block diagram illustrating the state transitions between overload and non-overload conditions as used in one embodiment.

FIG. 3B illustrates the overload states and transitions between them as used in one embodiment. In one embodiment, the current operational state (e.g., overload, non-overload, etc.) is maintained in a first element; while in one embodiment, the current operational state (e.g., overload, non-overload, etc.) is maintained in a second element. In addition, FIG. 3B illustrates state table and state logic circuit 380 used in one embodiment to determine a next state based on the current state and values of an upper threshold and a lower threshold determination of the occupancy level of one or more packet queues 314.

First, state machine 340 illustrates an overload state 344 and a non-overload state 342. In one embodiment, as indicated by start transition 341, the first element begins in non-overload state 342. When the upper threshold occupancy level is exceeded of one or more packet queues, then as indicated by transition 343, the state is changed to overload state 344. When the occupancy level drops below the lower threshold, then as indicated by transition 345, the state is changed to the non-overload state 342. In one embodiment, the upper and lower threshold values are different; while in one embodiment, the upper and lower threshold values are the same.

State table 360 presents these states and state transitions in a table format, with the overload state indicated by a state value of one, and the non-overload state indicated by a state value of zero. Upper threshold indication (UT) equals a one when exceeded, else it is zero; and lower threshold (LT) equals a zero when less than it, else it is one. In addition, state logic circuit 380 illustrates a circuit used in one embodiment for maintaining the current state in flip-flop 383, and for determining its next state 385 based on current state 384, the upper threshold signal 381, and lower threshold signal 382.

Returning to FIG. 3A, in one embodiment, forwarding engine 330 includes a small packet queue 332, an L3 packet processor 336, and a local processing element 331 (which typically provides some administration control of packet switch component 300, such as by updating routing and/or other data structures in L3 packet processor 336). Packets and condition indications 335 are communicated to L3 packet processor 336, which identifies based on the condition indication, a current overload condition state. Additionally, L3 packet processor 336 identifies, possibly based on a data structure lookup operation, a packet overload condition type (e.g., discard-on-overload, retain-on-overload, etc.) of the particular packet. L3 packet processor 336 then discriminately discards or further processes the particular packet, such as forwarding the non-discarded packets 337 to local processing element 331 or the non-discarded packets 339 to a next element or other component. In one embodiment, forwarding engine 330 discards the particular received packet if the current overload condition state includes the overload state and the packet overload condition type of the particular received packet includes discard-on-overload type. Otherwise, forwarding engine 330 further processing the packet.

Figure 4:
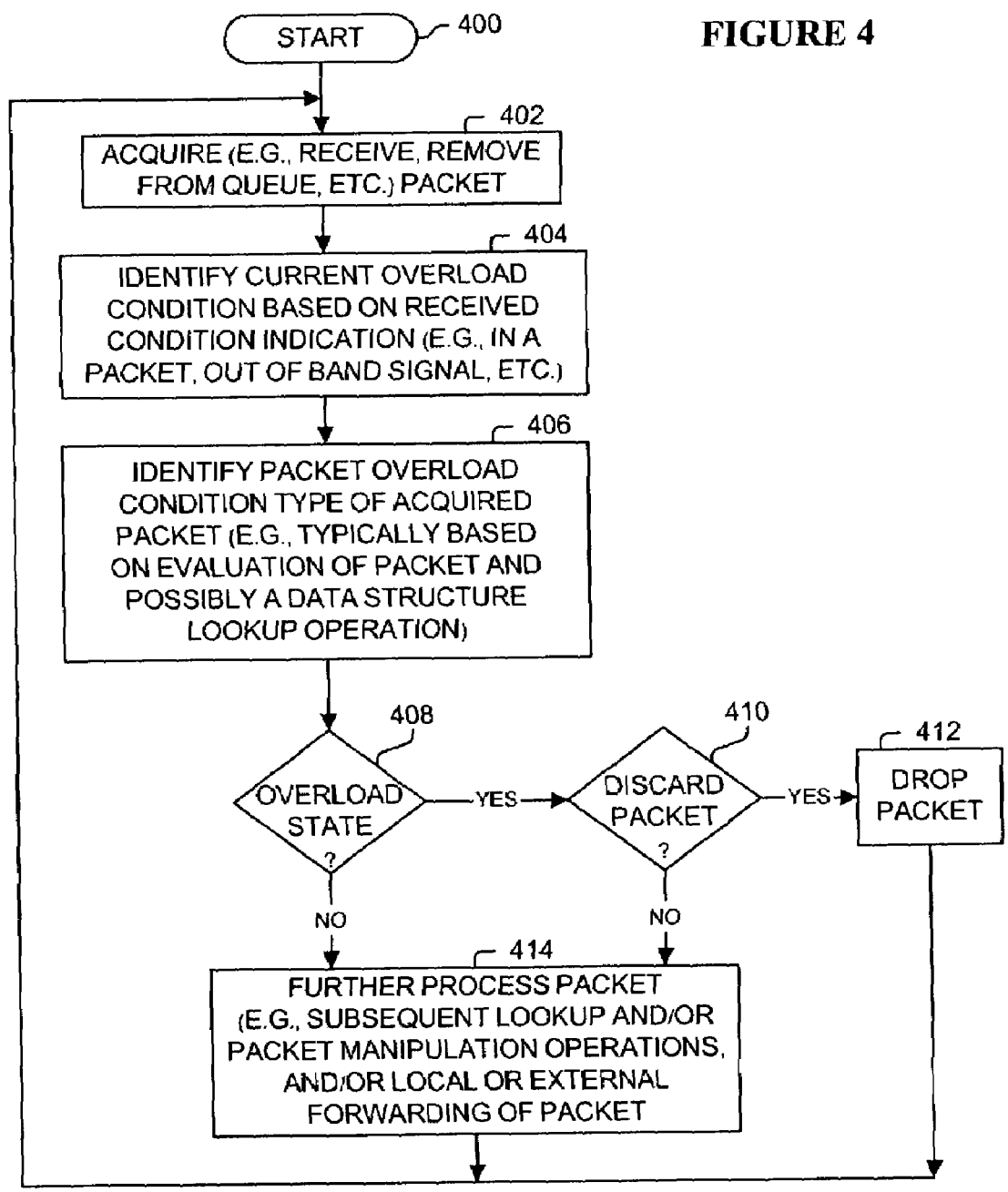
FIG. 4 is a flow diagram illustrating a process used in one embodiment for processing a packet based on the identified system operating (e.g., overload or non-overload) state and the type of packet.

FIG. 4 illustrates the processing of a particular packet by a second element in one embodiment. Processing begins with process block 400, and proceeds to process block 402, wherein the particular packet is acquired (e.g., received, removed from a queue, retrieved from memory, etc.) Next, in process block 404, the current overload condition state (e.g., overload, non-overload) is identified based on the received condition indication (e.g., in the particular packet, via a link, or any other communications mechanism.) In one embodiment, the received condition indication includes a value directly identifying the current overload condition state (e.g., a Boolean flag or value to indicate overload state or non-overload state). In one embodiment, received condition indication includes one or more values to indicate occupancy levels of one or more packet queues, directly or the resultant of one or more comparison operations with one or more predetermine threshold values.

Next, in process block 406, the packet overload condition type of the acquired packet is identified, such as based on the result (e.g., a local or remote destination of the particular packet, a type or priority of the packet, whether it is a control packet, whether it is a L2 keep alive packet, whether it is a route update packet, etc.) of a lookup operation based on values in one or more fields of the particular packet.

Next, as determined in process blocks 408 and 410, if the current overload condition state includes the overload state and the packet overload condition type of the particular received packet includes discard-on-overload type, then the packet is discarded (i.e., dropped) in process block 412. Otherwise, in process block 414, the particular packet is further processed (e.g., routing, classification, filtering, forwarding operations etc., which may include data structure lookup operations). Processing returns to process block 402, to acquire and process more packets.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for reacting to packet traffic conditions, the apparatus comprising:
    a L2 packet processing engine; and
    a forwarding engine coupled to the L2 packet processing engine;
    wherein the L2 packet processing engine includes: one or more packet queues configured to buffer a plurality of received packets; and an L2 packet processor configured to perform for each particular packet of the plurality of received packets: L2 packet processing operations on the particular packet and adding a condition indication of a current operating state of the L2 packet processing engine based on an occupancy level of said one or more packet queues; wherein the L2 packet processing engine is configured to forward each of the plurality of received packets to the forwarding engine; and wherein the operating state has at least one of a possible plurality of values including an overload and a non-overload state;
    wherein the forwarding engine includes: a buffer to receive each of the plurality of packets from the L2 packet processing engine; and a L3 packet processor configured to perform for each specific packet of the plurality of packets: an evaluation of the specific packet to identify the type of packet in order to determine whether to drop or further L3 packet process, including where to route, the specific packet in response to the operating state of the L2 packet processing engine as identified by the condition indication in the specific packet.

2. The apparatus of claim 1, wherein the specific packet is further processed when the specific packet corresponds to a particular control packet of a plurality of possible control packets.

3. The method apparatus of claim 2, wherein the plurality of possible control packets includes a route update packet and a L2 keep alive packet.

4. The apparatus of claim 1, wherein the L2 packet processing engine and the forwarding engine are on separate application-specific integrated circuits.

* * * * *

UNITED STATES PATENT AND TRADEMARK OFFICE
CERTIFICATE OF CORRECTION

PATENT NO. : 7,313,093 B1
APPLICATION NO. : 10/304421
DATED : December 25, 2007
INVENTOR(S) : Eatherton et al.

Page 1 of 1

It is certified that error appears in the above-identified patent and that said Letters Patent is hereby corrected as shown below:

Col. 10, line 56, replace "The method apparatus" with -- The apparatus --

Signed and Sealed this

Twenty-second Day of December, 2009

David J. Kappos
*Director of the United States Patent and Trademark Office*